No. 866,875. PATENTED SEPT. 24, 1907.
F. MAGILL.
PRUNING SHEARS.
APPLICATION FILED FEB. 6, 1907.
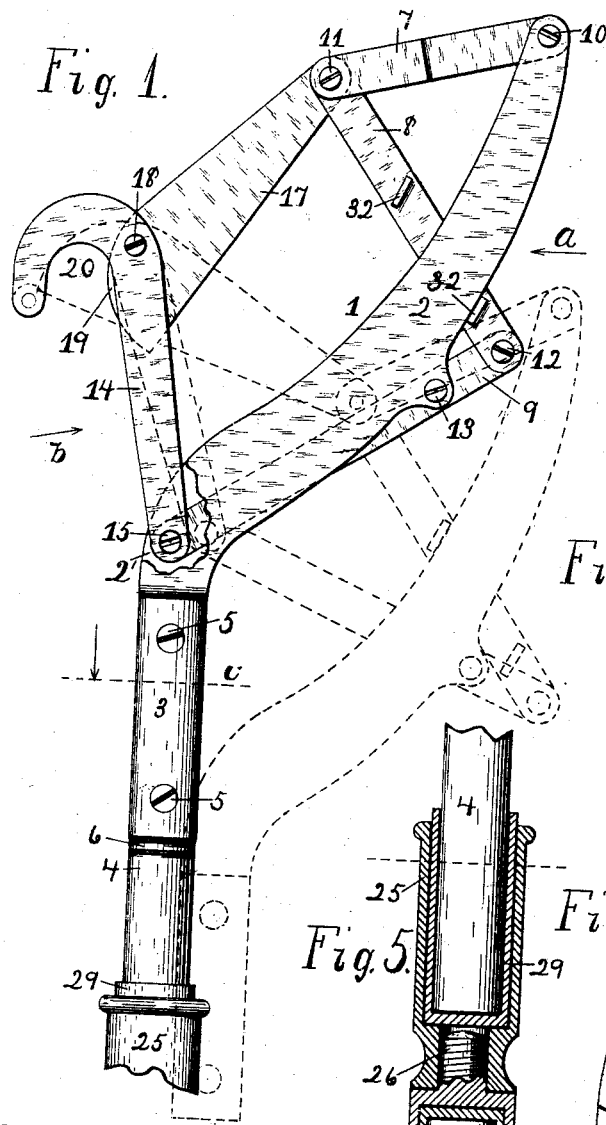
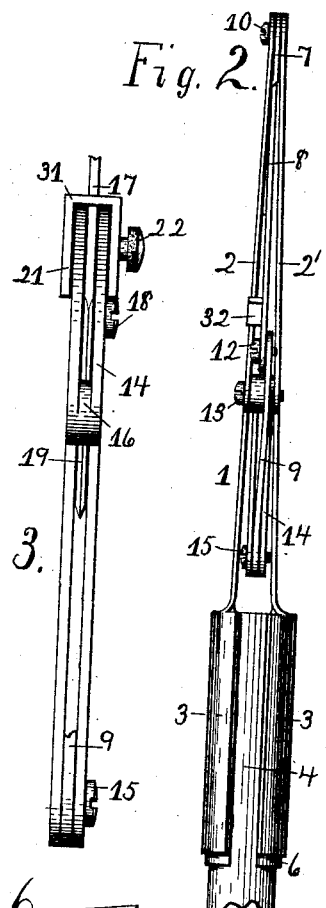
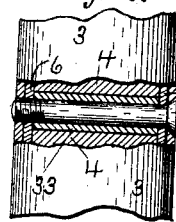
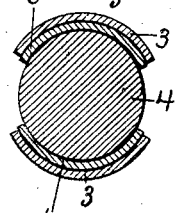
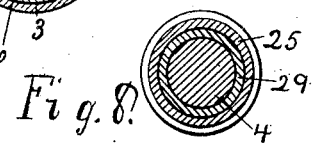
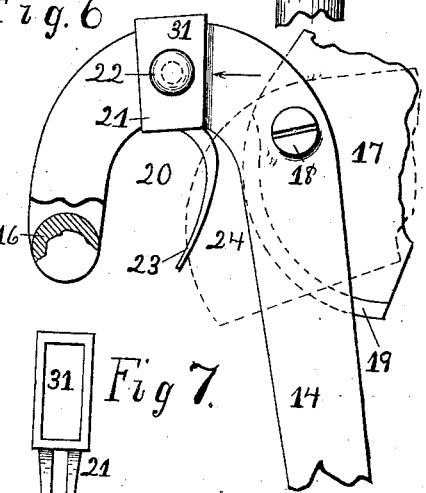
Attest:
A. M. Whitmore,
J. M. Dye.
Inventor:
Fergus Magill,
by E. B. Whitmore, Atty
THE NORRIS PETERS CO., WASHINGTON, D. C.

UNITED STATES PATENT OFFICE.

FERGUS MAGILL, OF WILLIAMSPORT, PENNSYLVANIA.

PRUNING-SHEARS.

No. 866,875.                Specification of Letters Patent.                Patented Sept. 24, 1907.

Application filed February 6, 1907. Serial No. 356,061.

*To all whom it may concern:*

Be it known that I, FERGUS MAGILL, of Williamsport, in the county of Lycoming and State of Pennsylvania, have invented a new and useful Improvement in Pruning-Shears, which improvement is fully set forth in the following specification and shown in the accompanying drawings.

My invention is an improved pruning shear embodying features of novelty and advantages of usefulness hereinafter fully explained.

This improved pruning shear is so constructed and the parts so arranged that when hooked onto a limb of a tree to be cut a simple downward pull upon the handle will serve to part the limb, the moving or operative parts of the shear acting automatically.

This pruning shear is also constructed for the purpose of conveniently and rapidly clipping the small twigs and suckers of a tree with slight motions of the parts, and means are provided for preventing injury to the operator while using the device, from dangerous electric currents and shocks that sometimes occur from current-wires touching the tree being trimmed.

Other objects and advantages of the invention will be brought out and made to appear in the following description and the novel features particularly pointed out in the appended claims, reference being had to the accompanying drawings which, with the reference characters marked thereon, form a part of this specification.

Figure 1 is a side elevation of the device, as in use, parts being shown in various positions by full and by dotted lines, a part of the handle being broken away. Fig. 2 is an edge view seen as indicated by arrow *a* in Fig. 1. Fig. 3 is an edge view of the hook seen as indicated by arrow *b* in Fig. 1, with the twig catch in place thereon. Fig. 4 is a transverse section taken as on the dotted line *c* in Fig. 1. Fig. 5 is a side elevation of parts of the handle, showing the coupling and insulation in central longitudinal section. Fig. 6 is a side elevation of the hook with the twig catch in place thereon, parts being broken away and the cutter shown in two positions by full and by dotted lines. Fig. 7 is an edge view of the catch for twigs, seen as indicated by arrow in Fig. 6. Fig. 8 is a transverse section of parts taken as on the dotted line in Fig. 5. Fig. 9 is a side elevation of a part of the handle and associated parts of the pruner head, parts being in central longitudinal section through the axis of a clamping screw. Figs. 3, 4, 6, 7 and 9 are drawn to a scale about twice that of the remaining figures.

Referring to the parts shown, 1 is the main part or body of the shear, holding a series of smaller coacting parts. This body or holder consists of two similar and equal right and left parts or members 2 2′ permanently joined or connected side by side, relatively immovable and with space between, by simple means as ordinary screws 10 and 13. The lower ends of the two parts 2 2′ of the body 1 are formed into equal longitudinal cylindrical portions 3 3, Figs. 1, 2, 4 and 9, concave toward each other to receive between them a pole or handle 4, of wood, as shown, simple means, as screws 5 5, being employed to hold the parts rigidly together. I further provide sheets 6 6 of insulating material, as indiarubber, between the parts 2 2′ and the handle 4 to prevent the passage of injurious or dangerous currents from electric wires that may chance to touch the tree being trimmed, through the pruner and the handle to the hands of the operator while using the device.

The members 2 2′ of the part 1 of the head of the pruner hold between them a series of unequal links 7, 8 and 9, joined and held to turn on pivot screws 10, 11 and 12 at their ends, the major link 9 also being pivoted, at 13, to swing between the parts 2 2′, as shown. To the lower extreme end of the link 9 is secured a divided hook 14, by a pivot screw 15, the end of said link being between the separated parts of the hook, as shown in Figs. 2 and 3. The parts of the hook 14 are equal and parallel, and rigidly joined side by side at their extreme ends by a spacer and connector 16, Figs. 3 and 6. The cutter or blade 17 is pivoted on a screw 18 between the members of the hook 14, its opposite end being held by the screw 11 of the links 7 and 8, as appears in Fig. 1, the cutter 17 and the hook 14 being carried by the links independent of the body 1 and relatively so joined that when the blade turns on the screw 18 its cutting end 19 will sweep across the space 20 of the hook.

The links 8 and 9, with the hook 14 and the blade 17, as united, form a jointed quadrilateral that may take various forms the short link 7, connecting one angle of the quadrilateral with the point of the main body 1, being the immediate operator for determining the form of the said four-sided figure. The links 8 and 9 are joined at a point distant from the hook and the cutter and these are connected distant from the two links, and when the parts of the shear are in the positions shown by full lines in Fig. 1, and ready for use, the angles at 11 and 15 of the quadrilateral are widely separated. And if the hook 14 be caught upon a limb and the handle 4 be pulled downward the hook will not descend, (except as to the slight yielding of the limb,) but the other parts of the device will assume, independently of the hook, the positions shown by dotted lines the quadrilateral taking the flat elongated form shown, with the angles at 11 and 15 near together. These actions of the parts will drive the cutter across the space 20 of the hook and so sever the engaged limb, the movements of the quadrilateral in both directions being limited by a pair of stops 32, Figs. 1 and 2, on the link 8 in positions to meet the opposing edges of the associated part 2 of the body 1. It will be further noted that the link 9 with the hook 14, and the link 7 with the blade 18, as connected and operated, constitute a pair of coacting toggle-joints, the actions of which materially increase the grip on the limb and the power of the cutter as it passes obliquely across the fiber of the wood.

With the hook 14 I employ a removable fork 21, Figs. 3, 6 and 7, for catching and clipping the smaller twigs and suckers of the tree. This twig catch has a hollow rectangular body 31 to pass upon the hook, as shown, it being held to place by simple means as a set screw 22, and formed with tines 23 in position to have the edge of the cutter 17 pass between them in its advance movements. The tines are in such relative positions with the hook that they hold the twigs near the edge of the cutter 17—in the space 24—so that a slight forward motion of the cutter will serve to sever them.

The length of the handle is immaterial to this invention, but in constructing the device I sometimes prefer to make the portion of the handle 4, next the head of the cutter, short and provide it with an insulated coupling metal section 25, as shown in Figs. 5 and 8. This section is axially bored and threaded at its lower end to receive the reduced threaded end 26 of a corresponding section 27 on the end of an extension handle 28. With the parts 4 and 28 of the handle are provided, within the metal sections 25 and 27, insulating thimbles 29 and 30 of indiarubber or similar insulating material to act with the insulators 6 above described to prevent electrical currents passing downward to the hands of the operator, these insulators 29 and 30 being secured to the adjacent parts by some nonconducting means, as cement or by other simple means. The clamping screws 5 are sheathed in indiarubber tubes 33, as shown in Fig. 9, for additional insulation, and these with the insulating sheets 6 are ordinarily sufficient for the protection of the operator. But in cases where the parts of the pruner and the handle are covered with flowing water, as while working in the rain the additional insulators 29 and 30 may be needed.

What I claim as my invention and desire to secure by Letters Patent is:—

1. A pruning shear having a main portion, a series of connected links carried by said main portion, a hook and a cutter, joined to act pivotally, carried by said links independent of the main portion, and a handle joined to the main portion.

2. A pruning shear having a main portion, a series of pivotal links carried by the main portion, a divided hook pivotally connected with one link of the series, and a cutter held to move pivotally between the separated parts of the hook and connected movably with other links of the series, and means for operating the parts.

3. A pruning shear having a main portion consisting of two equal right-and-left members joined side by side with space between, a series of connected links held movably between said separated members, a hook consisting of two similar and equal members joined side by side with space between and movably connected with a link of the series between the members of said main portion, a cutter disposed pivotally between the members of the hook and pivotally connected with a joined pair of said links, and an operating handle for the parts rigidly joined to said main portion.

4. A pruning shear having a main portion or body, parts including a hook and a coacting cutter connected movably to form a quadrilateral carried by said body, and means for changing the form of the quadrilateral to cause the cutter to cross the space within the hook.

5. A pruning shear having a main portion or body, members including a hook and a coacting cutter connected movably to form a quadrilateral carried by said body, and means for changing the form of the quadrilateral to cause the cutter to cross the space within the hook, and stops for limiting the expanding and contracting movements of the quadrilateral.

6. A pruning shear having a main portion or body, parts including a hook and coacting cutter carried by said body and disposed to form a quadrilateral pivoted at its angles, a link connecting an angle of the quadrilateral with said body, and a handle joined to said body to move the parts of the shear independent of the hook.

7. A pruning shear comprising a body-portion, parts disposed to form a quadrilateral movable as to its members carried by the body-portion, the quadrilateral including a hook for engaging the limb and a cutter controlled by the hook, a link connected movably with the body-portion and an angle of the quadrilateral, one member of the latter being pivotally joined to the body-portion, and means for operating the parts.

8. A pruning shear comprising a body-portion, a hook and a link pivotally connected and the link being pivotally held by said body-portion, a cutter and a link pivotally connected, the said two links being pivotally joined at a point distant from the hook and the cutter, and said hook and cutter being pivotally connected at a point distant from the links, and means for moving the ends of the hook and of the cutter distant from their common pivot toward and from each other, the hook with its associated link and the cutter with its associated link acting as a pair of toggle-joints.

9. A pruning shear having a main portion, a series of connected links carried by said main portion, a hook and a cutter, joined to act pivotally, carried by said links independent of the main portion, and a handle joined to the main portion, there being insulating bodies disposed between the handle and the adjacent parts of said main portion.

10. A pruning shear having a main portion, a series of connected links carried by said main portion, a hook and a cutter carried by said links the latter and said hook and the cutter being joined pivotally to act together, and means for operating said joined parts, there being a detachable fork on the hook to act with the cutter.

11. A pruning shear having a main portion, a series of links joined carried by said main portion, a hook and a cutter carried by said links and connected to act pivotally, and a handle in separable sections joined by a coupling, and insulators for said coupling and the sections of the handle.

In witness whereof, I have hereunto set my hand this 30th day of January, 1907, in the presence of two subscribing witnesses.

FERGUS MAGILL.

Witnesses:
E. B. WHITMORE,
GEORGE A. McGONEGAL.